Patented Apr. 25, 1933

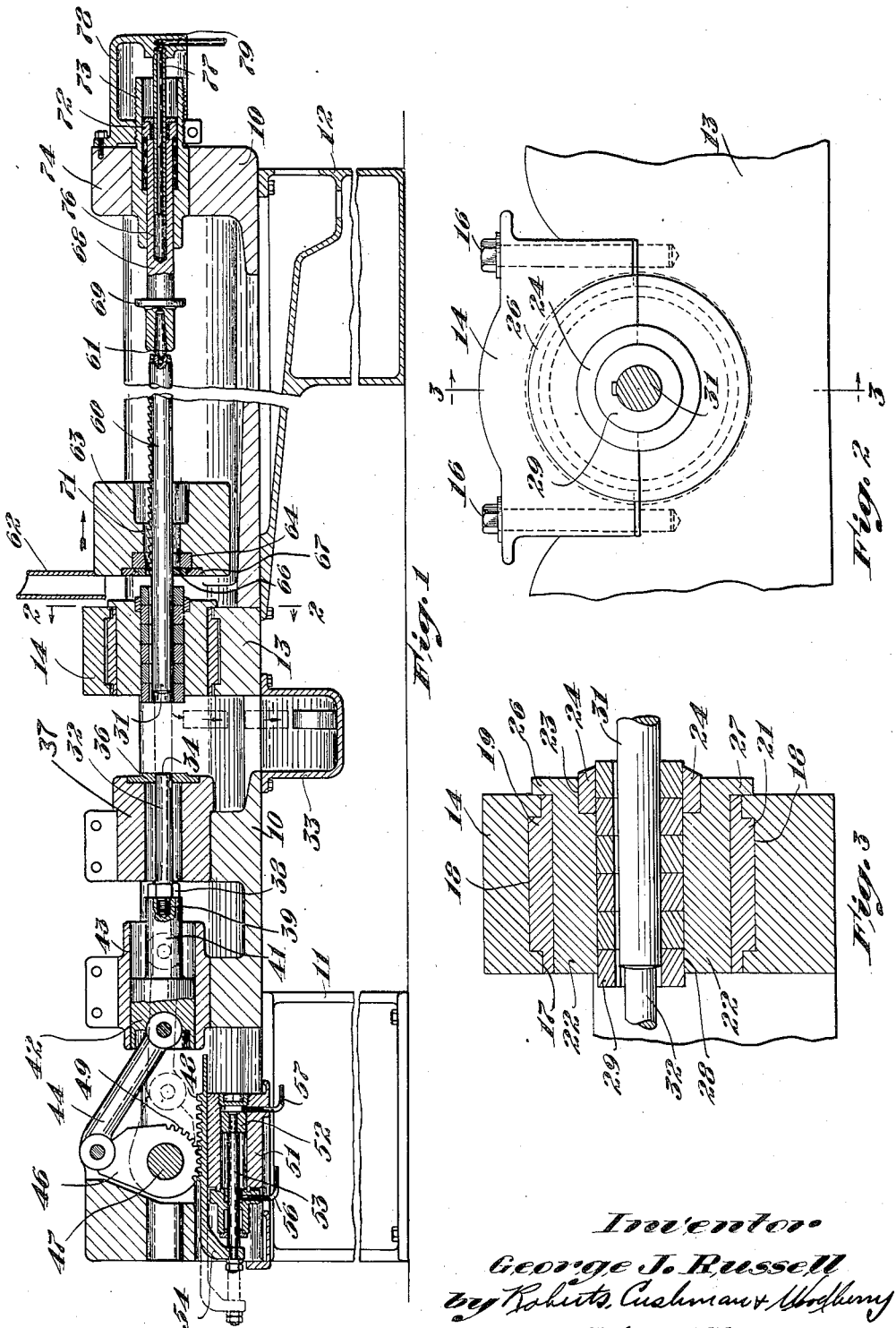

1,905,507

UNITED STATES PATENT OFFICE

GEORGE J. RUSSELL, OF WALTHAM, MASSACHUSETTS

EXTERNAL BROACHING MACHINE

Application filed January 30, 1930. Serial No. 424,558.

This invention relates to broaching and to apparatus for external broaching as well as to apparatus for performing both internal and external broaching operations.

In broaching operations it is important that the stock be guided accurately to the broaching tool and this becomes particularly difficult to accomplish with external broaches for various reasons. If during the broaching operation relative movement is effected between the guide and the broaching tool considerable precaution must be exercised to see that these relatively movable parts are accurately lined up and centered during all portions of their relative motion and these parts must also be capable of preserving this correct arrangement when subjected to the pressures required for broaching. Apparatus of this character is expensive to manufacture due to the accuracy required for the working parts, and furthermore such apparatus is expensive to maintain in proper working order particularly as wear occurs. As a result of these conditions it not infrequently happens that a high degree of accuracy is not attained because of the expense either of making or of maintaining apparatus capable of functioning with requisite efficiency. Moreover stock to be broached may have openings therein of irregular contour such as to require a special internal guide which may of necessity be relatively small in cross-section and therefore difficult to maintain in accurate alignment during relative movement.

Objects of the present invention are to improve the art of broaching; to provide improved apparatus for external broaching; to provide for performing external broaching without effecting relative movement between the stock guiding means and the broaching tool; and to provide improved apparatus for performing both internal and external broaching at one stroke.

Apparatus embodying the features of the present invention may comprise an external broaching tool mounted in a fixed support and an internal guide may be supported in fixed position within the broaching tool during broaching. As the internal guide does not move relative to the external broach it is only necessary to maintain in accurate alignment that portion of the guide which extends within the broach. This makes it possible to avoid the expense of maintaining with a high degree of accuracy the surfaces of bearings or other relatively movable engaging surfaces. Moreover, with apparatus of this character the desired efficiency is attained by fixed parts which provide a sturdy rugged construction capable of preserving the desired special arrangement.

When both internal and external broaching are to be performed the body or shank of the internal broach may serve as the internal guide for stock advanced to the external broach. An external guide may also be arranged to receive stock from the external broach and stock disposed in this external guide may serve as a support for the internal guide.

In the drawing:

Fig. 1 is a longitudinal vertical section of a broaching machine;

Fig. 2 is a section taken substantially along the line 2—2 of Fig. 1; and

Fig. 3 is a view taken substantially along the line 3—3 of Fig. 2.

Broaching apparatus illustrative of the features of the invention, as shown in the drawing, comprises a machine having a bed plate 10 supported on end pedestals 11, 12, and at the central portion of the apparatus a transversely disposed member integral with or otherwise fixed to the bed plate. This transversely disposed member has a removable cap 14 which is releasably secured to the transverse member by means of bolts 16 passing through vertical holes in the cap and having threaded engagement in tapped and threaded holes in the transverse member. A longitudinally disposed, substantially cylindrical bore 17 is formed partly in the cap and partly in the transverse member. The intermediate portion of this bore is counterbored to provide an annular recess 18 in which annular enlargements or abutments 19, 21, formed on segmental members 22 disposed within the bore, may slidably fit so as to hold these segmental members against longitudinal movement relative to the transverse support member. These segmental members have an annular recess 23 in which an external broach 24 is mounted and also have outwardly projecting flanges 26, 27 which engage the vertical faces of the transverse member 13 and of the cap 14 respectively, to transmit to these support members the thrust received during broaching.

The segmental members 22 extend longitudinally beyond the external broaching tool to provide a passage 28 of substantially uniform cross-section which functions as a guide for pieces of stock 29 which have passed through the external broach. Pieces of stock disposed within this external guide serve as supports for an internal guide 31 which maintains these pieces of stock in proper alignment as they are advanced to and through the external broach. This internal guide is held stationary during the external broaching operation by engagement with an abutment member 32 which is moved longitudinally into engagement with the end of this internal guide during the external broaching, and which is withdrawn after the completion of the external broaching operation to permit pieces of stock to be discharged from the external guide into a chamber or discharge chute 33 attached to the bottom of the bed plate.

The abutment member 32 is in the form of a longitudinally disposed rod which operates through a hole 34 in a vertically disposed guiding plate 36 affixed to a cylindrical guide member 37. A nut 38 and stud 39 may be formed integrally with one end of this abutment rod by means of which the rod may be attached to a tapped and threaded hole in the adjacent end of the rod 41 of a reciprocating head 42 which operates in a cylindrical guide member 43 supported by the bed plate. As the abutment 32 is advanced the rod 41 of the piston guide is slidably received in the bore of the cylindrical member 37. A pitman rod 44 is pivotally connected to the head 42 and to a crank arm 46 mounted upon a transverse shaft 47 which is supported in fixed bearings (not shown) carried by a stationary part of the machine. The arrangement of the crank 46, pitman arm 44 and piston guide 42 is such that when the abutment is advanced the crank is slightly beyond dead-center so that no power is required to hold the abutment in fixed position in engagement with the forward end of the internal guide member. Power for operating the crank 46 to advance and withdraw the abutment 32 is transmitted through a reciprocable rack 48 which engages a gear sector 49 formed on the adjacent portion of the crank. This rack is slidably supported on the exterior top wall of a cylinder 51 in which a piston 52 operates to transmit power, through the piston rod 53 which is connected to a depending lug 54 formed on one end of the rack, to reciprocate the rack. Operating fluid is admitted and discharged to the cylinder through the ports 56, 57.

The apparatus shown is intended to be used for both internal and external broaching, and for this reason the rear end or shank of the internal broach 60 is utilized as an internal guide for the external broaching operation. The rear end of this internal broaching tool is adapted to be supported by a front center 61 during both the internal and external broaching operations, and it will be understood that the movable abutment 32 likewise remains in engagement with the end of the internal guide or broach during both the internal or external broaching operations. Stock to be broached is supplied through a vertically disposed chute 62 mounted upon a reciprocating stock carrier 63. Stock is received from the chute when the carrier is withdrawn to the right (in the direction of the arrow, Fig. 1) to the end of its stroke, at which time the front center 61 is withdrawn to permit new stock to be introduced to the carrier. At this time the movable abutment 32 may be withdrawn from the rear end of this broaching tool to permit stock to be discharged from the external guide 28.

The forward side of the stock carrier 63 is recessed to receive a filler ring 64 against which is disposed a broach engaging plate 66 having an opening therein of substantially the same contour as the broach used. This broach engaging plate is held in the carrier against the filler ring 64 by means of a locking plate 67 which has interlocking engagement therewith and is fixed to the carrier 63 by means of screws or in any other approved manner. The broach engaging plate serves as a steady rest for the internal broaching tool during advance and withdrawal of the stock carrier.

The front center 61 is mounted in a center retaining member 68 which has an exterior collar 69 engageable with an interior shoulder 71 in the stock carrier so that as the latter is returned this interior shoulder will engage the collar and force the center retaining member 68 to the right to remove the center 61 from the front end of the internal broaching tool. The rear end of the center retaining member is enlarged in the form of a head 72 which is guided for reciprocatory motion in a cylinder 73 adjustably fixed to the transverse end member 74 of the frame. This center retaining member also has a bore 76 extending from the rear end thereof, and a tubular member 77 fits within this bore and is connected to a casting 78 affixed to the transverse end member 74. A passage 79 is formed in the casting for conducting pressure fluid to the tubular member 77 so that such fluid may be utilized for displacing or advancing the center retaining member 68 to effect engagement of the center 61 with the front end of the internal broach.

From the foregoing it will be evident that, in the illustrated embodiment, the rear end or shank of the internal broach constitutes an internal guide for the stock while the latter passes through the external broach, the abutment or rod 32 constitutes means for holding the guide against axial movement relatively to the external broaching tool 31, and the parts 22 comprise an external guide for the stock adjacent the external tool so that the internal guide is supported on the external guide through the medium of the stock, solely while the internal guide is disengaged by abutment 32 and back-center 61 and conjointly during broaching.

I claim:

1. A broaching machine comprising an external guide, a broaching tool mounted thereon, an internal guide extending through the stock past said tool into the external guide, means for producing axial movement of stock relatively to both guides and said tool at the same time, and means movable into fixed engagement with the end of said internal guide during the entire broaching operation, said movable means disengaging the guide between broaching operations to discharge broached stock.

2. A broaching machine comprising an external broaching tool, external and internal guides extending axially of the stock adjacent said tool, the guides being shaped and positioned simultaneously to engage the stock externally and internally during and between broaching operations, and abutment means movable into fixed engagement with the internal guide during broaching operations and disengageable therefrom between broaching operations whereby the internal guide is supported by the external guide through the medium of the stock while the guide is disengaged by said abutment means.

3. A broaching machine comprising internal and external broaching tools, movable means engageable with the internal broaching tool for holding the latter relatively fixed with respect to the external broaching tool, the movable means being disengageable from the internal broaching tool to provide for removal of broached stock therefrom, and means for producing relative axial movement between the stock and the tools to effect internal and external broaching.

4. A broaching machine comprising internal and external broaching tools, means for forcing the stock over the internal tool and through the external tool to effect internal and external broaching, and means movable into engagement with the ends of the internal tool for holding the latter against axial movement during one of the broaching operations.

5. A broaching machine comprising internal and external broaching tools, means for producing relative axial movement between the stock and the tools to effect internal and external broaching, and means movable into engagement with the ends of the internal tool for holding the latter against axial movement during both of the broaching operations.

6. A broaching machine comprising coaxial internal and external broaching tools, means for producing relative axial movement between the stock and the tools to effect internal and external broaching, and means having fixed engagement with each end of the internal tool during the entire broaching operation for centering the tools relatively to each other.

7. A broaching machine comprising coaxial internal and external broaching tools, means for producing relative axial movement between the stock and the tools to effect internal and external broaching, and means having fixed engagement with the internal tool at each end thereof, and other means engaging this tool intermediate the ends thereof, both of the latter means being effective during the entire broaching operation for centering the tools relatively to each other.

8. A broaching machine comprising coaxial internal and external broaching tools, the internal tool having a cutter and a succeeding non-cutting portion and the external tool surrounding a part of said non-cutting portion, means for producing relative axial movement between the stock and the tools to effect internal and external broaching, and an external guide surrounding said portion to receive the stock after passing the cutting edge of the external tool, the internal diameter of said guide approximating that of the external tool, whereby the stock between the guide and said non-cutting portion supports the internal tool and centers it relatively to the external tool in juxtaposition to the external tool.

9. A broaching machine comprising coaxial internal and external broaching tools, the internal tool having a cutter and a succeeding non-cutting portion and the external tool surrounding a part of said non-cutting portion, means for producing relative axial movement between the stock and the tools to effect internal and external broaching, means engaging the end of the internal broach during the broaching operation and disengaging the end thereof during the return movement to discharge the stock, and an external guide surrounding said portion to receive the stock after passing the cutting edge of the external tool, the internal diameter of said guide approximating that of the external tool, whereby the stock between the guide and said non-cutting portion supports the internal tool during said return movement.

10. A broaching machine comprising stationary internal and external broaching tools, the internal tool having a cutter and a succeeding non-cutting portion, an external guide for slidably receiving and supporting pieces of stock disposed on the internal tool and thereby supporting the latter through the medium of such stock, said external guide extending lengthwise of said non-cutting portion and supporting the external tool at its entrance, means for producing relative axial movement between the stock and the tools to effect internal and external broaching and means for holding the tools in fixed relation to each other axially of the stock during the broaching operations, the internal tool being supported by said guide solely through the medium of broached stock on said non-cutting portion during recurrent periods while stock is fed to and from opposite ends of the internal tool.

11. A broaching machine comprising an external broaching tool, an internal guide for slidably receiving and guiding pieces of stock and holding the latter from axial tilting movement relative to this guide as the stock is advanced to and beyond said external tool, said internal guide being disposed within said external tool and extending through the stock past said tool, said internal guide having its ends accessible for receiving and discharging pieces of stock, means for supporting previously broached pieces of stock disposed on said internal guide and for maintaining such pieces of stock in substantial alignment about a predetermined axis and thereby supporting said internal guide through the medium of broached stock while the ends of said guide are accessible for receiving and discharging stock, means for forcing stock along said internal guide past said tool, and means for holding said internal guide against axial movement relatively to the broaching tool.

12. A broaching machine comprising an external broaching tool, an internal guide for slidably receiving and guiding pieces of stock and holding the latter from axial tilting movement relative to this guide as the stock is advanced to and beyond said external tool, said internal guide being disposed within said external tool and extending through the stock past said tool, said internal guide having its ends accessible for receiving and discharging pieces of stock, external means for slidably engaging and supporting previously broached pieces of stock disposed on said internal guide and thereby supporting said internal guide through the medium of such pieces of stock while the ends of said guide are accessible for receiving and discharging pieces of stock.

Signed by me at Boston, Massachusetts this twenty-seventh day of January 1930.
GEORGE J. RUSSELL.